(12) United States Patent
Poling et al.

(10) Patent No.: US 11,898,112 B2
(45) Date of Patent: Feb. 13, 2024

(54) PONDED ASH BENEFICIATION SYSTEM AND RELATED METHODS

(71) Applicant: Ash-TEK, LLC, Boca Raton, FL (US)

(72) Inventors: Christopher Poling, Bel Air, MD (US); Nico W. Scheeres, Boca Raton, FL (US)

(73) Assignee: Ash-TEK, LLC, Boca Raton, FL (US)

(*) Notice: Subject to any disclaimer, the term of this patent is extended or adjusted under 35 U.S.C. 154(b) by 0 days.

(21) Appl. No.: 17/686,980

(22) Filed: Mar. 4, 2022

(65) Prior Publication Data

US 2022/0282174 A1 Sep. 8, 2022

Related U.S. Application Data

(60) Provisional application No. 63/157,550, filed on Mar. 5, 2021.

(51) Int. Cl.
*C10J 3/00* (2006.01)

(52) U.S. Cl.
CPC .......... *C10J 3/00* (2013.01); *C10J 2300/0946* (2013.01); *C10J 2300/0959* (2013.01); *F23G 2209/30* (2013.01)

(58) Field of Classification Search
CPC .......... C04B 18/08; C04B 20/02; C04B 20/04; C04B 2111/1087; C04B 7/26; Y02W 30/91
See application file for complete search history.

(56) References Cited

U.S. PATENT DOCUMENTS

| 5,399,194 A * | 3/1995 | Cochran ................ F27B 15/00 |
| | | 106/478 |
| 6,802,898 B1 * | 10/2004 | Liskowitz ............... C04B 18/08 |
| | | 241/5 |

(Continued)

FOREIGN PATENT DOCUMENTS

| WO | WO-9937592 A1 * | 7/1999 | ............ C04B 18/08 |
| WO | WO-2011003428 A1 * | 1/2011 | ............ C04B 18/08 |

OTHER PUBLICATIONS

International Search Report, dated Jun. 15, 2022, PCT/US2022/018977.

*Primary Examiner* — Imran Akram
(74) *Attorney, Agent, or Firm* — Richard P. Gilly; RPG Law Group (57) ABSTRACT

A ponded ash beneficiation system and related methods treat either landfilled or ponded waste coal fly ash by removing at least 75% of the carbon from a collected quantity of such waste coal fly ash. Analysis and testing of the collected waste coal fly ash to determine optimal air balance, indirect heat temperature and retention time. Subjecting a stream of such waste coal fly ash to temperatures ranging from 900° F. and 1150° F. along with air addition calibrated as a function of the LOI of the carbon in such waste coal fly ash. This stream is exposed to the foregoing range of temperatures and corresponding air addition for a range of time between 20 minutes and 90 minutes, in certain aspects of the disclosure. A system for beneficiating landfilled or ponded waste coal fly ash makes use of a carbon reduction kiln comprising multiple independent heat zones so that the waste coal fly ash is preferably exposed to indirect heat when received in such zones.

9 Claims, 6 Drawing Sheets

(56) References Cited

U.S. PATENT DOCUMENTS

| | | | |
|---|---|---|---|
| 8,833,279 B1* | 9/2014 | Knowles | C04B 18/146 |
| | | | 96/306 |
| 2002/0017224 A1* | 2/2002 | Horton | C04B 28/021 |
| | | | 106/710 |
| 2004/0033184 A1 | 2/2004 | Greer | |
| 2004/0231566 A1* | 11/2004 | Wang | C04B 28/021 |
| | | | 106/705 |
| 2006/0283355 A1* | 12/2006 | Knowles | F23G 5/32 |
| | | | 106/405 |
| 2007/0045299 A1 | 3/2007 | Tranquilla | |
| 2008/0282947 A1 | 11/2008 | Knowles | |
| 2012/0174825 A1 | 7/2012 | Vazquez Favela et al. | |
| 2015/0144029 A1* | 5/2015 | Yin | C04B 40/0039 |
| | | | 106/803 |
| 2022/0106235 A1* | 4/2022 | Guynn | C04B 28/10 |

* cited by examiner

FIGURE 5: Raw Landfilled Waste Ash
@1.05 KX Magnification

FIGURE 6: Processed Landfilled Waste Ash
@ 1.05 KX Magnification

|  | Moisture | LOI | % Passing 325 Screen | SiO$_2$ | Al$_2$SO$_3$ | Fe$_2$O$_3$ | Si+Al+Fe | CaO | MgO | SO$_3$ | Strength Activity Index 7-Day % of Control | Strength Activity Index 28-Day % of Control |
|---|---|---|---|---|---|---|---|---|---|---|---|---|
| PABS Processed Material | 0.12% | 1.40% | 75.4 | 58.24 | 24.38 | 4.03 | 86.65 | 7.93 | 1.1 | 0.39 | 80% | 87% |
| PABS Processed Material | 0.04% | 1.20% | 83.5 | 57.02 | 24.48 | 4 | 85.5 | 8.17 | 1.14 | 0.78 | 83% | 92% |
| PABS Processed Material | 0.04% | 2.20% | 89.9 | 61.91 | 22.47 | 4.47 | 88.85 | 5.25 | 1.4 | 0.32 | 83% | 91% |
| PABS Processed Material | 0.24% | 1.10% | 85.4 | 57.06 | 24.39 | 4.02 | 85.47 | 8.05 | 1.11 | 0.84 | 80% | 86% |
| PABS Processed Material | 0.00% | 0.30% | 87.6 | 49.2 | 28.1 | 12.6 | 89.9 | 2.82 | 0.84 | 0.81 | 81% | 95% |

FIGURE 7: Beneficiated Landfilled Ash Performance in Concrete

PONDED ASH BENEFICIATION SYSTEM AND RELATED METHODS

CROSS REFERENCE TO RELATED APPLICATION

This application claims priority to U.S. Provisional Patent Application No. 63/157,550, filed on Mar. 5, 2021, the entire contents of which are hereby incorporated by reference.

FIELD

The present disclosure relates to treatment of landfilled or ponded waste coal fly ash in general, and to landfilled or ponded waste coal fly ash which, in particular, does not meet ASTM specifications for Class 'F' or Class 'C' fly ash.

BACKGROUND

Coal fly ash is generated as a byproduct of the operation of coal fired power plants along with boiler slag, bottom ash, and FGD gypsum. Collectively these are known as Coal Combustion Byproducts (CCB). The CCB's may have chemical properties, constituent elements, cross contaminations, or physical qualities which makes the material unsuitable for beneficial re-use as a secondary raw material. CCB materials which cannot be used as a secondary raw materials or for beneficial re-use are landfilled or sent to waste settling ponds. The initial characteristics of coal fly ash which leads to these materials being sent to a landfill or waste settling pond generally includes coarse particle size, high sulfur contents, loss on ignition (LOI)>6% (high carbon content) and low concentrations of constituent elements such as Calcium, Silica, Alumina, or Iron.

Coal fired power plants generate a consistent coal fly ash CCB based on the type of coal utilized and the design of the boiler itself. While the design of the boiler did not change over the course of the life of the coal fired power plant the source of the raw coal itself changed significantly due to environmental regulations and economics. The ash generated from various sources of coal was all sent to the same waste coal ash landfill or waste settling pond. This variability in the source of the coal has been found to be evident in the co-mingled ash of a landfill or waste settling pond. This variability in the waste coal ash further contributes to the lack of recycling as a secondary raw material due to its inconsistency. Constituent elements such as Calcium, Silica, Alumina, Iron, Sulfur, Titanium, in addition to LOI can vary widely in a single waste settling pond or landfill.

Waste coal fly ash which has been placed into a landfill or waste settling pond will oxidize over time and increase in particle size. This natural chemical process leads to an increase in particle size with a corresponding decrease in reactivity due to the oxidation of the particle surface. Alkalis such as Potassium, Calcium, Magnesium and Sodium present in the ash particle combine with water and form deposits on the surface of the particle. Iron and Aluminum present in the ash will form bonds with oxygen in the atmosphere which will also form deposits on the particle surface. Landfilled or Ponded waste coal ash does not meet the ASTM specification for particle size which further contributes to lack of recycling as a secondary raw material due to its variability, limited reactivity, and particle size.

Waste coal fly ash which has been placed into a landfill or waste settling pond will increase in moisture content. This natural activity is due to exposure to atmosphere over the course of time since placement. Moist or wet waste coal fly ash does not meet the ASTM specification for moisture content which further contributes to lack of recycling as a secondary raw material due to its material handling issues, variability, reduced reactivity, and general poor mix performance.

Waste coal fly ash which has been placed into a landfill or waste settling pond will further become contaminated with organic materials and/or hydrocarbons. The organics are often derived from the natural processes surrounding the waste landfill or settling pond. Grasses will grow on the surface and various forms of life will utilize the ash landfill or settling pond for natural processes.

Hydrocarbons from the heavy equipment used to create the landfill or to recover boiler slag from a pond are also often encountered in specific areas where equipment was refueled or suffered a leak.

Landfilled or Ponded Waste Coal Fly Ash is inherently different than freshly generated 'off spec' coal fly ash based on the oxidation state, moisture content, organics, chemical variability, hydrocarbons, weathering and particle size growth which occurred over the time spent in landfill or pond. A landfilled or ponded waste coal fly ash beneficiation system must address these recurring constituent issues which are in addition to reducing LOI.

This is further exampled in the research below:

"The reactions of fly ash with water are complex and significant chemical and physical changes occur within conditioned ashfields for periods of several months to several years. The weathering processes affect the performance of fly ash and may limit its use for pozzolan for concrete . . .

Salts containing sodium, potassium, calcium, magnesium, sulfide, carbonate and hydroxide ions occur, particularly as surface deposit . . .

There is a reduction in total surface area

Reaction products are deposited on the ash particles and act as a barrier to pozzolanic reaction."

University of Dundee, 'Coal Combustion Products in the United Kingdom and the Potential of Stockpile Ash' May 2015.

"wet-storage causes changes to the physical and chemical properties of fly ash. Initially, cohesive forces form between moist particles, with chemical reactions then leading to agglomeration. This has been noted to cause an increase in water requirement and reductions in reactivity."

University of Dundee Innovative Processing of Stockpile Fly Ash Working Draft Report January 2019.

Coal fly ash is one of the largest types of industrial waste generated in the United States. According to the American Coal Ash Association's Coal Combustion Product Production & Use Survey Report, nearly 130 million tons of coal ash was generated in 2014 alone.

CCB landfills and waste settling ponds are scattered throughout the world. According to the 2015 Coal Combustion Residuals Rule there are over 738 such facilities in the United States alone. This rule specifies that all unlined surface impoundments are required to retrofit or close. Additionally, the rule establishes a revised date, Apr. 11, 2021, by which unlined surface impoundments and units that failed the aquifer location restriction must cease receiving waste and initiate closure or retrofit. EPA determined this new feasible date after a thorough review of the construction timeline information submitted during the public comment period. In essence, the CCB waste settling ponds themselves will be remediated and eliminated. This typically requires removal and relocation of the waste material to a properly lined landfill. The cost impact to relocate waste coal fly ash will be significant and still allows for potential regulatory changes to occur.

It is preferred to re-use the coal fly ash as a secondary raw material in lieu of relocating or burying it in another landfill. One application is to use coal fly ash as a building material in concrete. Recycling waste coal fly ash in concrete is challenging due to the potential unsuitable qualities or characteristics of the CCB, outlined above. In addition to such characteristics, the local market may not support the additional cost for ash beneficiation in regard to either volume or price.

Freshly generated waste coal fly ash may be recycled through various processes including carbon burnout and triboelectric separation. Each of these techniques have specific disadvantages which prevent them from being widely adapted for landfilled or ponded waste coal fly ash. Each process requires a dry free flowing material and perform best with LOI values greater than 6% and ideally 9%. Landfilled or ponded waste coal fly ash is inherently coarse, moist, contaminated with organics and debris which would not be usable in a fluidized bed or triboelectric system.

Fluidized bed carbon burnout and triboelectric separation each require large permanent stationary equipment, support structures and foundations. The overall cost for these installations is cost prohibitive for small markets with limited volumes. In addition, these aforementioned systems cannot process moist ash which is typical of landfilled or ponded waste coal fly ash. The aforementioned systems cannot process ash which contains debris or particles which cannot be fluidized. Alternative carbon burnout systems have not gained industry acceptance due to a combination of cost and hydrogen sulfide emissions from proprietary integrated scrubbers.

None of the current processes address the landfilled or ponded waste coal fly ash issues of oxidation state, moisture content, particle size growth, organics, hydrocarbons, particle separation or blending requirements due to chemistry. Landfilled or Ponded waste coal fly ash could not successfully be processed through these system without extensive modifications. The resultant produced ash from these systems is limited to the particle size, moisture content, chemistry and oxidation state of the fresh dry feed ash available directly from a coal fired power plant.

In view of the foregoing, it would be desirable to overcome the drawbacks and disadvantages of current systems and methods to recycle landfilled or ponded waste coal fly ash efficiently and effectively and to more efficiently or to more effectively beneficiate landfilled or ponded waste coal fly ash CCB's with such treatments or methods resulting in an improved beneficiated coal ash suitable for use in concrete building materials as a Class 'C' or Class 'F' ash meeting all ASTM standards.

SUMMARY

In one possible implementation, a process for beneficiating landfilled or ponded waste coal fly ash involves forming a waste coal fly ash stream that has greater than 2% LOI of carbon. Typically, such waste coal fly ash stream is formed by collecting waste coal fly ash from one or more ponds or landfills. The waste coal fly ash stream undergoes certain processing steps discussed herein, including subjecting the stream to elevated temperatures sufficiently above ambient temperature to remove at least 75% of the carbon from the waste coal fly ash. Characteristics of the waste coal fly ash are determined so that appropriate elevated temperatures are used to treat the waste coal fly ash in order to remove at least 75% of the carbon. Air is injected or otherwise added to the processing of the waste coal fly ash stream to create an oxygen-rich atmosphere while subjecting such waste coal fly ash stream to the elevated temperature. The oxygen-rich atmosphere is likewise predetermined as a function of one or more characteristics of the collected waste coal fly ash so that such atmosphere, in combination with the predetermined elevated temperatures, reduce the LOI of the waste coal fly ash to 2% or less when such steps are performed over a processing time and thus form a beneficiated coal fly ash.

The process, in one version, includes steps to form a beneficiated coal fly ash characterized by a minimum of 66% of the beneficiated coal fly ash particles passing through a 44 micron screen.

Further processing steps of the beneficiated coal fly ash may involve insertion thereof into a separate system adapted to reduce particle size and oxidation of the beneficiated coal fly ash.

The processing might involve insertion of the waste coal fly ash at earlier phases of the process into a moisture reduction vessel.

A suitable system for performing the various processing steps herein to form beneficiated coal fly ash involves a hopper having a feed mechanism to deliver landfilled or ponded waste coal fly ash as a stream. The carbon reduction processes may be performed in a carbon reduction kiln having multiple independent heat zones to expose the waste coal fly ash stream to indirect heat. The discharge rate of the carbon reduction kiln may vary between different tons per hour, and in one suitable implementation, may vary between 5 to 50 tons per hour.

These and other aspects of the disclosure may be understood more readily from the following description and the appended drawings.

BRIEF DESCRIPTION OF THE DRAWINGS

One or more implementations of the ponded ash beneficiation system and method is illustrated in the figures of the accompanying drawing, which is meant to be exemplary and not limiting, in which like references are intended to refer to like or corresponding parts, and in which.

DETAILED DESCRIPTION

One suitable method for accomplishing some or all of these beneficiation improvements is a Ponded Ash Beneficiation System (PABS) which includes a volatilization vessel such as a carbon reduction kiln, integrated with a dryer, classifiers, screens and specialized equipment for particle size reduction/oxidation removal. Integration of process additions or admixture additions is dependent upon the specific waste coal fly ash and can be introduced at several locations in the PABS process or at a single location.

In an illustrative embodiment, the treatment systems and methods disclosed herein relate to the reduction of hydrocarbons, organics, moisture and LOI content from waste coal fly ash CCB'S, which had previously been produced and landfilled or disposed of in a coal ash landfill or waste sediment pond by a coal fired power plant.

In another illustrative embodiment, the treatment systems and methods disclosed herein relate to the particle size reduction of oxidized waste coal fly ash CCB's which had previously been produced and landfilled or disposed of in a coal ash landfill or waste sediment pond by a coal fired power plant. The oxidation and particle size growth of the waste coal fly ash occurred over time after being disposed of due to poor quality or chemistry of the waste coal fly ash when freshly generated. Oxidation is physically removed from the surface and new surface areas area are created through particle size reduction.

In another illustrative embodiment, the treatment systems and methods disclosed herein relate to the addition of admixtures or process additions in advance of particle size reduction to oxidized waste coal fly ash CCB's which had previously been produced and landfilled or disposed of in a waste sediment pond by a coal fired power plant.

In another illustrative embodiment, the treatment systems and methods disclosed herein relate to the addition of admixtures or process additions in advance of LOI reduction to waste coal fly ash CCB's which had previously been produced and landfilled or disposed of in a waste sediment pond by a coal fired power plant.

In yet another illustrative embodiment, the treatment systems and methods disclosed herein relate to the reduction of LOI, the reduction in moisture, and the addition of admixtures or process additions in advance of particle size reduction to waste coal fly ash CCB's which had previously been produced and landfilled or disposed of in a waste sediment pond by a coal fired power plant.

In an illustrative implementation, a method for beneficiating this waste coal fly ash CCB may include the following steps: excavating the waste coal fly ash to create waste ash stockpiles for testing. These various piles will be mechanically blended to create homogenous target chemistry which will be suitable for Class 'F' after processing; collecting the blended waste ash and heating the collected materials at temperatures suitable to drying to create a free-flowing waste ash particle; collecting the free-flowing waste coal fly ash and screening it to remove a specific coarse fraction of coal slag or bottom ash (if necessary); collecting the screened or unscreened free-flowing waste coal fly ash; removing the oxidation while reducing the particle size such that the resultant material meets ASTM guidelines; collecting the particle-size-reduced waste coal fly ash and heating it at such a temperature and for suitable duration with controlled air balance to volatilize the carbon or carbonate and sublimate specific forms of sulfur; maintaining this temperature is maintained long enough to force the carbon or carbonate into controlled volatilization to create a beneficiated coal fly ash which will be used a secondary raw material in concrete.

In certain implementations, the process for producing a beneficiated coal fly ash involves collecting and testing a bulk quantity of landfilled or ponded waste coal fly ash from an excavated stockpile.

The collected coal waste coal fly ash may be tested or may be otherwise determined to have the following characteristics:

1. moisture content greater than 3% and as high as 40%
2. particle size distribution of less than 66% passing 44 microns and particles as large as 1500 microns
3. 30% LOI or less
4. other potential chemical deficiencies relating to Calcium, Silica, Aluminum and Iron
5. other potential concrete performance deficiencies related to air entrainment, water demand, strengths or workability
6. measurable presence of hydrocarbons and organics In one exemplary process, there are four general processing steps to achieve beneficiated fly ash: (1) the waste coal fly ash pond or landfill is excavated to create stockpiles of waste coal fly ash suitable for testing and blending. (2) the blended stockpiles are generally created to match a single day of the PABS production requirements accounting for losses related to moisture, debris, and LOI reduction. Multiple stockpiles are created to allow for blending of selected stockpiles to achieve targeted chemical requirements prior to processing in Step 2.

In step 2, the collected waste coal fly ash is blended into a common stream and the moisture is reduced at least 95% resulting in a dry, free-flowing waste coal fly ash stream. This moisture reduction is accomplished by screening the material down to ¼" diameter or less and subjecting the waste coal fly ash stream to direct heat, such heat ranging from 212 F-350 F and heat exposure for 20-60 minutes. The range of heat exposure for the waste coal fly is determined so as to reduce the Moisture Content from its initial level to 3% moisture or less. Upon completion of the moisture removal, the dry waste coal fly ash is transferred to Step 3, preferably directly, for screening and classification, particle size reduction, and/or admixture or process addition.

In Step 3, the dry waste coal fly ash is blended into a common stream and the particle size is reduced by 95% resulting in a fine, dry free-flowing waste coal fly ash stream. This particle-size reduction is accomplished to achieve a highly angular particle size and increased surface area. Using a traditional vibratory ball mill, rod mill, or vertical roller mill, this is accomplished by metering the feed into the bottom of the mill and increasing the retention time. In another preferred embodiment, the dried waste coal fly ash particle size reduction is accomplished using an aero acoustic mill, jet mill or resonance mill. The aero acoustic mill operating principle of extreme pressure variation separates the oxidation from the dry waste fly ash surface while fracturing the remaining ash particle without crushing it. The particle size reduction is confirmed using a dynamic separator or classifier with oversize material being recirculated for further particle size reduction or oxidation removal.

In another possible implementation of Step 3, the dry free flowing ash may be chemically analyzed, after which it is dosed with suitable chemical admixtures or process additions so as to meet chemical specifications and ensure that thorough and complete homogenization of the fine, dry, free-flowing waste coal fly ash has been achieved. Upon completion of the particle size reduction and/or the aforementioned or further admixture or process additions, the fine dry waste coal fly ash is transferred, preferably directly, to Step 4 for hydrocarbons, organics and LOI reduction and/or admixture or process additions.

In Step 4, the fine, dry waste coal fly ash is blended into a common stream and the LOI is reduced, resulting in a beneficiated coal fly ash stream. This volatilization or sublimation is preferably accomplished by subjecting the fine, dry, waste coal ash stream to indirect heat, such heat preferably ranging between 950° F. and 1150° F., and such heat exposure preferably occurring from 20 minutes to 90 minutes.

Lower temperature and time ranges may likewise be suitable in such processing, depending on the material being treated or intended application. The retention time for the fine dry waste coal fly ash is targeted so as to reduce the LOI from its initial level to 2% of carbon or less. Upon completion of the range of the exposure time, the fine dry free flowing waste ash is removed from the indirect heat. The ash is then cooled to form a beneficiated coal fly ash. One suitable use of the beneficiated coal fly ash is in the concrete industry, as a supplementary cementitious material meeting and exceeding all ASTM C618 specifications, or other applicable industry specifications.

In another possible implementation of Step 4, specific chemical admixtures or process additions are dosed into the fine, dry, free flowing waste ash stream prior to or immediately after the LOI reduction. The timing, dosing, and other parameters may be determined by the chemical nature of the admixture or process additions in relation to ash stream characteristics, such as temperature sublimation points and chemical interactions, as well as desired chemistry or characteristics of the resultant beneficiated output.

In yet another possible variation of Step 3, the ash may be blended with another stream of process additions or cementitious material and sent for particle-size reduction to generate a ternary blend of beneficiated ash. The ternary blend of beneficiated coal fly ash is suitable for use in the concrete industry as a supplementary cementitious material meeting and exceeding all ASTM C618 specifications.

A further step contemplated herein relates to heat recovery and exhaust treatment, and allows the exhaust from Step 1 to be used as a partial replacement for the combustion air for Step 4 as preheat air. In another possible implementation, the dust collector filter exhaust may also be routed as partial replacement for combustion air in Step 4. This addition allows the carbon reduction kiln itself to function as a thermal oxidizer and destroy harmful emissions. This step also allows the combustion air to be preheated, reducing energy requirements and improving efficiency.

Another step in certain implementations uses the exhaust of Step 4 as a portion of the input air for Step 2. This step allows for the preheating of the material itself prior to entry into Step 2 which will further reduce energy requirements and improve efficiency.

Still another variation relates to aspects of step 4 above and relates to carbon reduction. For example, the low concentrated volume of greenhouse gas emissions which have not been in contact with the waste coal fly ash can be utilized in the production of algae. This will allow the carbon reduction portion of the PABS line to operate with zero greenhouse gas emissions from the carbon reduction process. The resulting algae can then be dried and utilized as a coal replacement fuel in a cement kiln process.

In further implementations, the method may be implemented by means of a PABS in the form of modular stationary facility processing several hundred thousand tons per year of landfilled or ponded waste coal fly ash.

Such modular approach to the design of the Ponded Ash Beneficiation System (PABS) may also allow the system to be made portable to specific job sites for temporary application of the processes disclosed herein. The overall processing volume may be a function of characteristics of the material itself, or the physical limits of the portable equipment. In its portable form, the PABS system can be deployed to improve waste coal fly ash while solely beneficiating the deficient aspect of the ash without having to treat the aspects of the ash which are already in compliance.

For example, the PABS system may include one or more modules to perform subset processes to achieve one or more of the following:

1. Reducing the LOI without reducing the particle size/oxidation
2. Reducing the particle size/oxidation without reducing the LOI
3. Reducing the LOI and the particle size/oxidation without reducing the feed moisture
4. Reducing the LOI and the moisture without reducing the particle size/oxidation
5. Reducing the particle size/oxidation without reducing the feed moisture The PABS processes disclosed herein include treatment of a first, bulk quantity of the landfilled or ponded waste coal fly ash and generating the beneficiated coal fly ash as a second bulk quantity, and the second bulk quantity of the beneficiated stream is less mass than the first bulk quantity. In some applications, the mass reduction between first and fourth bulk quantities may be as much as 30%-40%, such as with wet waste coal fly ash after beneficiation. Mass reduction may be greater for the foregoing landfilled or ponded waste coal fly ash, depending on the moisture, loss-on-ignition (LOI), waste debris or other characteristics of the landfilled or ponded waste coal fly ash treated. Regardless of the mass reduction amount, the improved stream is substantially a beneficiated coal fly ash free of the plurality of factors currently preventing its use.

In one implementation, the PABS system utilizes a carbon reduction kiln which is specifically designed to accommodate the particular waste coal fly ash being processed. The variations of the design of such carbon reduction kiln may relate to selection, arrangement, or configuration of one or more components of such ash reduction kiln, such as the size and location of an internal ash retention ring, design of the feed seals, or the design of the internal lifter flights. In certain implementations, the internal retention ring is placed at a point within the carbon reduction kiln where the upstream portion is focused on removing the remaining moisture and the downstream portion is focused on reducing the LOI. Upstream of the internal retention ring, the processing environment is kept under a negative pressure to ensure the removed moisture does not create a steam blanket across the face of the downstream ash. Such a steam blanket at a downstream location may inhibit the LOI reduction and negatively impacting the energy efficiency.

Operations and components of the PABS are selected or configured so that air balance within the carbon reduction kiln itself improves or maximizes thermal efficiency.

Upstream to the internal retention ring the carbon reduction kiln is configured to substantially remove any remaining moisture from the material. In one suitable implementation, there is no additional air provided to this location and correspondingly the carbon reduction kiln is maintained at a negative pressure on the upstream side of the internal retention ring. Downstream of the internal retention ring, the processing environment is maintained in a controlled oxygen-rich atmosphere based on the carbon content of the landfilled or ponded waste coal fly ash. This balance of carbon (LOI) in relation to oxygen insures that enough oxygen is available within the carbon reduction kiln to create $CO_2$. This portion of the carbon reduction kiln may be kept under such oxygen-rich atmosphere at a sufficient level to assure or increase assurances that the LOI is reduced by the amounts, and the products of such processing are carried with the moist air to the downstream dust collection carbon filter. The foregoing ensures that the PABS system is providing ample oxygen to the specific location of the LOI reduction within the carbon reduction kiln.

The lifter flight section within the carbon reduction kiln is preferably designed to expose the waste coal fly ash being processed to the internal gas flows without creating a significant volume of airborne dust. In one suitable design, the lifter flights may be vented angular or vented curved sections mounted across the internal face of the carbon reduction kiln. The angle of the lifter flights is such as to generate a smooth cascade of waste coal fly ash against the drum without inducing violent updrafts.

In one preferred implementation, the carbon reduction kiln is configured to enable precise control of the turnover roll of the waste coal fly ash being processed before and after the internal retention ring.

Figure 1:
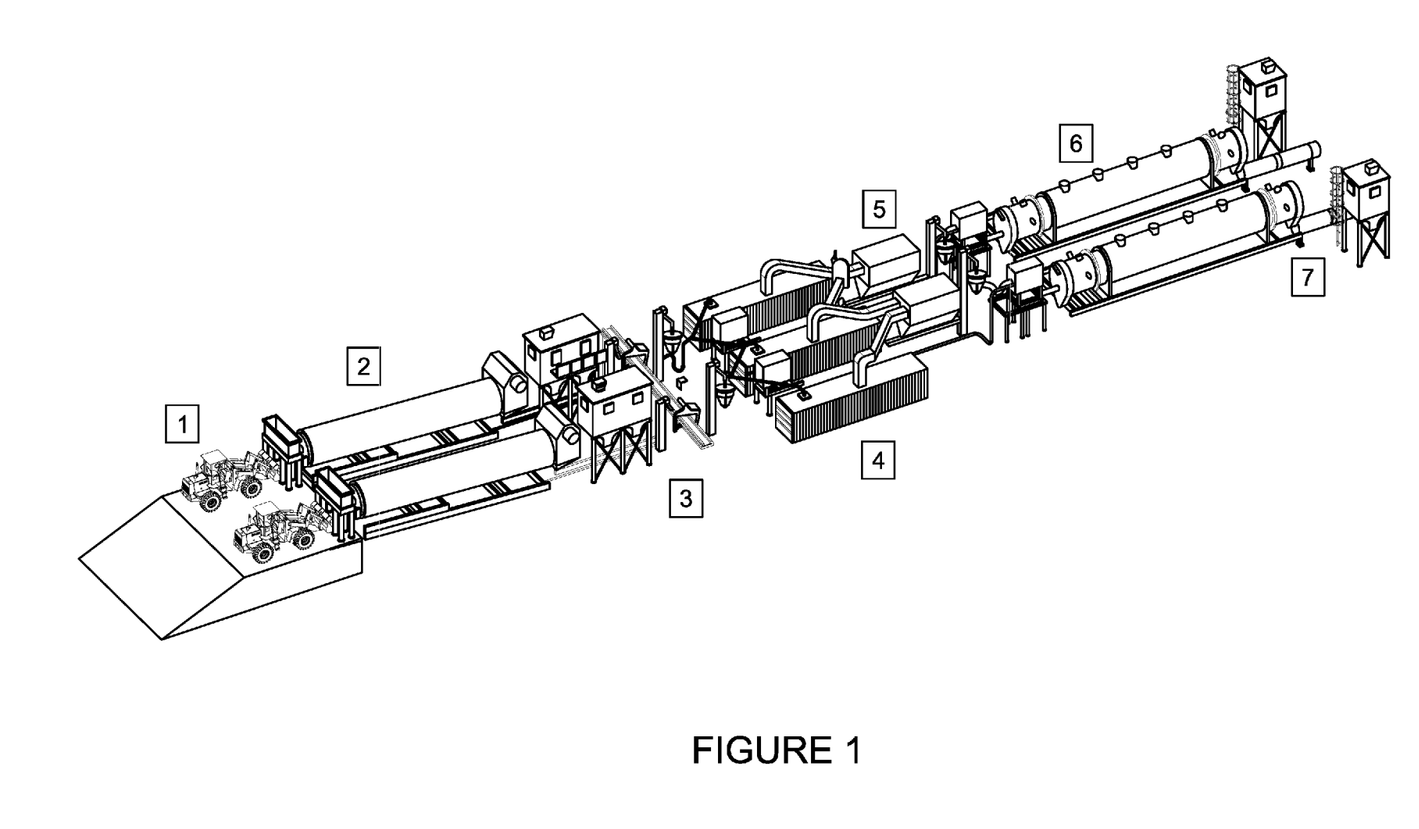
FIG. 1 is a schematic diagram of one possible implementation of a system, associated apparatus, and related methods for beneficiating landfilled or ponded waste coal fly ash.

Certain exemplary implementations of the foregoing systems and related methods for treating landfilled or ponded waste coal fly ash are described below with more particular reference to FIGS. 1-7 hereof FIG. 1 is a schematic diagram of one possible implementation of a system, associated apparatus, and related methods for beneficiating landfilled or ponded waste coal fly ash.

As illustrated in FIG. 1, waste coal fly ash may be stockpiled, tested and transferred into a feeder (1), for example, a clay feeder, or counterrotating auger feeder. From the feeder, the landfilled or ponded waste coal fly ash is transferred to a dryer (2), for example, a rotary drum dryer or aero acoustic dryer. As illustrated in FIG. 1, the dried landfilled or ponded waste coal fly ash is transferred to or through the coarse material screen to remove rocks, and/or large organic materials via a high angle vibrating deck screen (3). The screened dried landfilled or ponded waste coal fly ash is transferred to a particle size reduction system (4) such as a cage mill, vertical roller mill or aero acoustic device for particle size reduction. A recirculation system (5) segregates coarse particles for re-processing, using components such as a high efficiency separator or cyclonic separator. Following particle size reduction, the landfilled or ponded waste coal fly ash is transferred to a volatilization vessel for LOI reduction (6), such as a carbon reduction kiln. Cooling and conveyance of the beneficiated ash is accomplished via thermal transfer screw (or similar devices) and downstream conveyances.

The exact configuration of the conveying mechanisms, whether by pneumatic transfer, bucket elevator, metering screw or other means, and the configuration of the dryer, screen, particle size reduction or volatilization zone or vessel, as well as their spatial relation to each other, may be varied depending on the particular application, and so means or method of transferring the landfilled or ponded waste coal fly ash to the reference components beyond that illustrated may be used.

Figure 2:
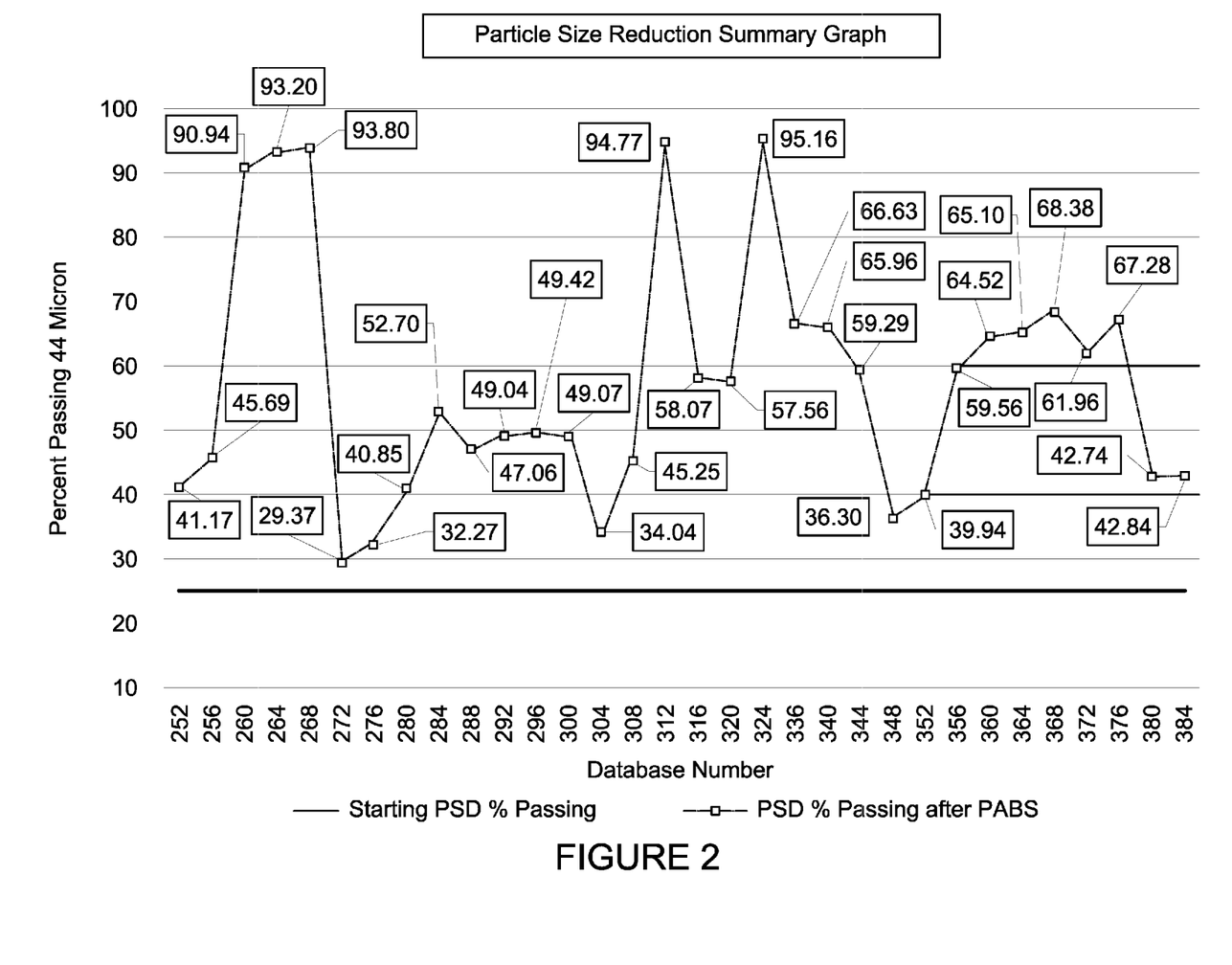
FIG. 2 is a table that sets out test results for landfilled or ponded waste coal fly ash related to particle size reduction, such results obtained by employing the system and related methods of this disclosure.

FIG. 2 is a table that sets out test results for landfilled or ponded waste coal fly ash related to particle size reduction, such results obtained by employing the system and related methods of this disclosure.

As illustrated in FIG. 2, the data illustrates the particle size reduction aspect of the material before and after processing using the systems and related methods discussed herein, such as the PABS described herein. As shown, prior to such processing, 100% of the unprocessed samples from multiple landfilled or ponded waste coal fly ash samples did not achieve 66% passing of 44 micron, with the most common particle size demonstrating less than 25% of the particles passing 44 micron. After processing through the particle size reduction system as disclosed herein, a significant amount of the materials was shown to achieve the target, with the remaining samples being sent for re-processing as part of the integrated recirculating load.

Figure 3:
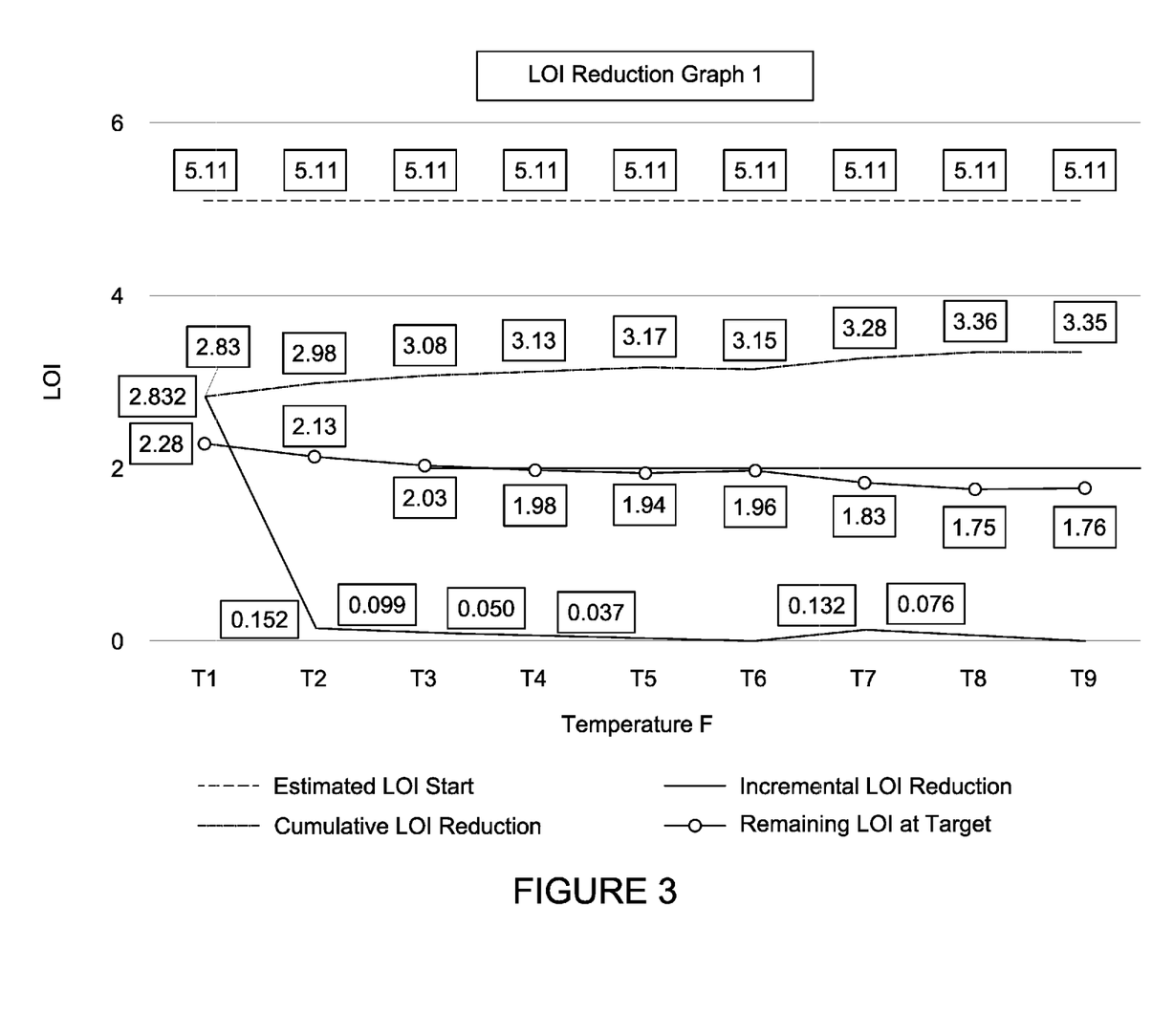
FIG. 3 is a table that sets out test results for landfilled or ponded waste coal fly ash related to LOI reduction, such results obtained by employing the system and related methods of this disclosure.
Figure 4:
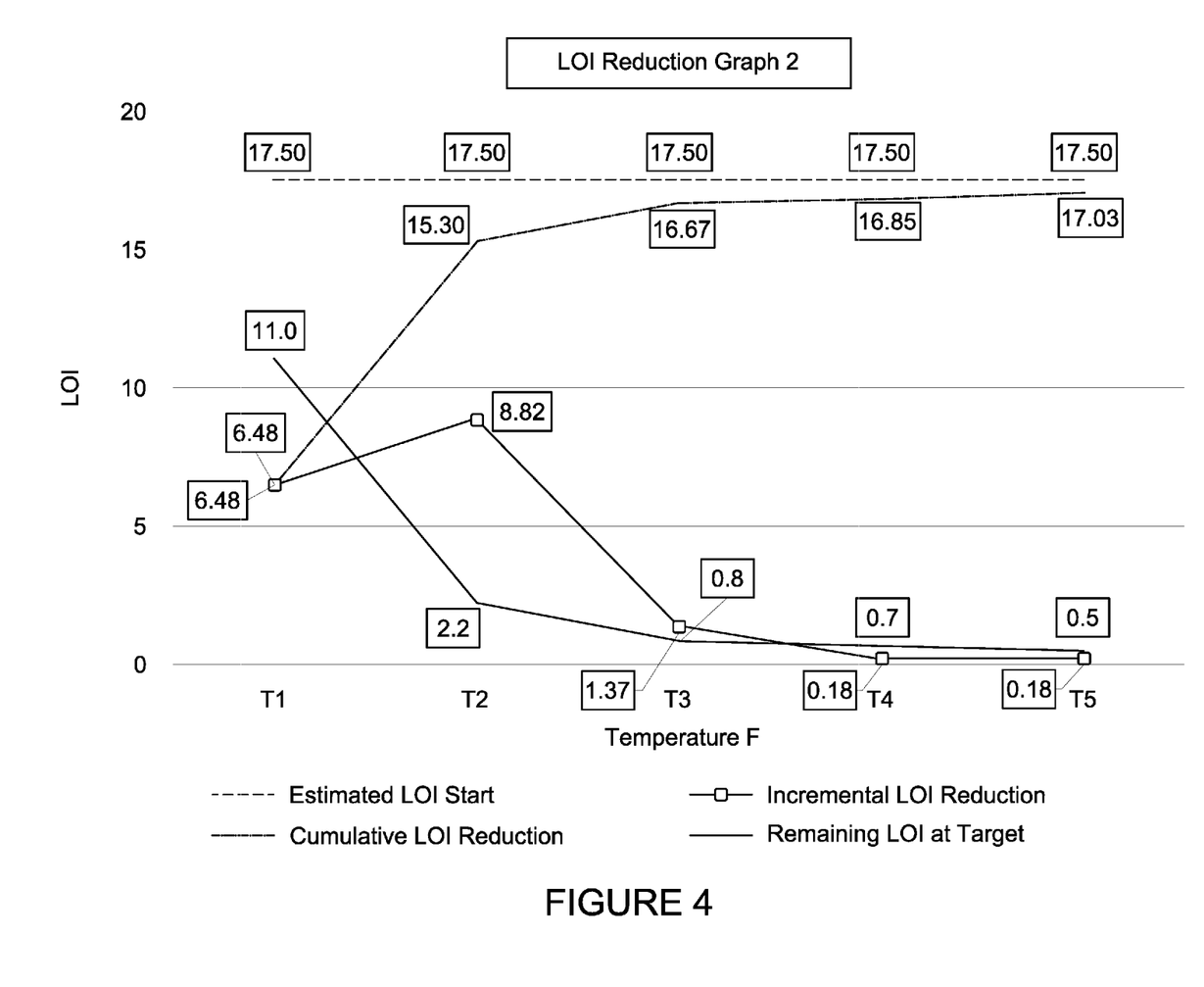
FIG. 4 is a table that sets out test results for landfilled or ponded waste coal fly ash related to concrete test results and performance, such results obtained by employing the system and related methods of this disclosure.

FIG. 3 is a table that sets out test results for landfilled or ponded waste coal fly ash related to LOI reduction, such results obtained by employing the system and related methods of this disclosure. FIG. 4 is a table that sets out test results for landfilled or ponded waste coal fly ash related to concrete test results and performance, such results obtained by employing the system and related methods of this disclosure.

As illustrated in FIG. 3 and FIG. 4, the LOI content of 2 different particle-size-reduced landfilled or ponded waste coal fly ash was reduced to less than 2%. By way of explanation of the tables:

FIG. 3: Graph 1 illustrates a starting LOI of 5.11% and a beneficiated LOI of 1.76%.

FIG. 4: Graph 2 illustrates a starting LOI of 17.5% and a beneficiated LOI of 0.5%

Figure 5:
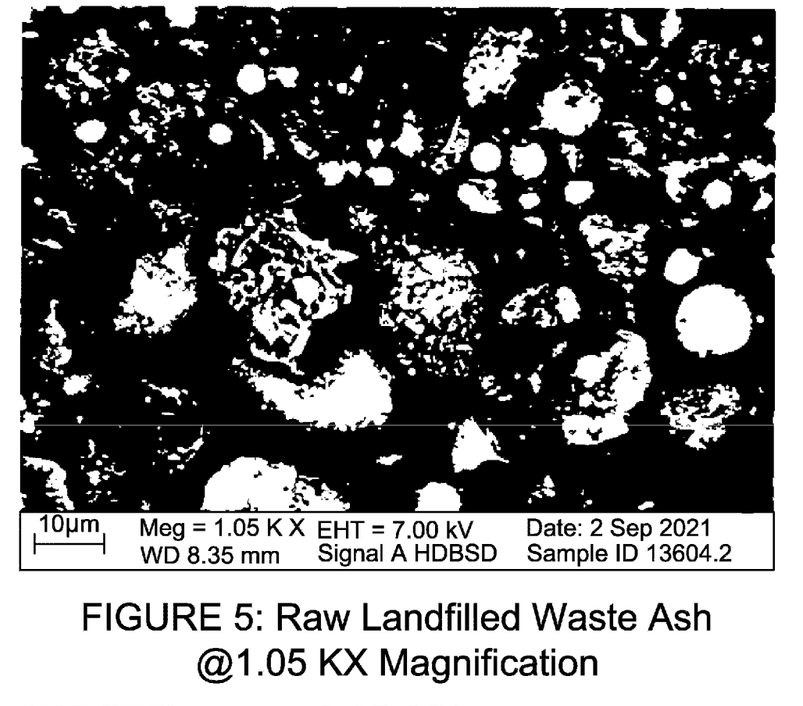
FIG. 5 is an electron microscope photo of waste landfilled coal fly ash prior to be processed pursuant to this disclosure.
Figure 6:
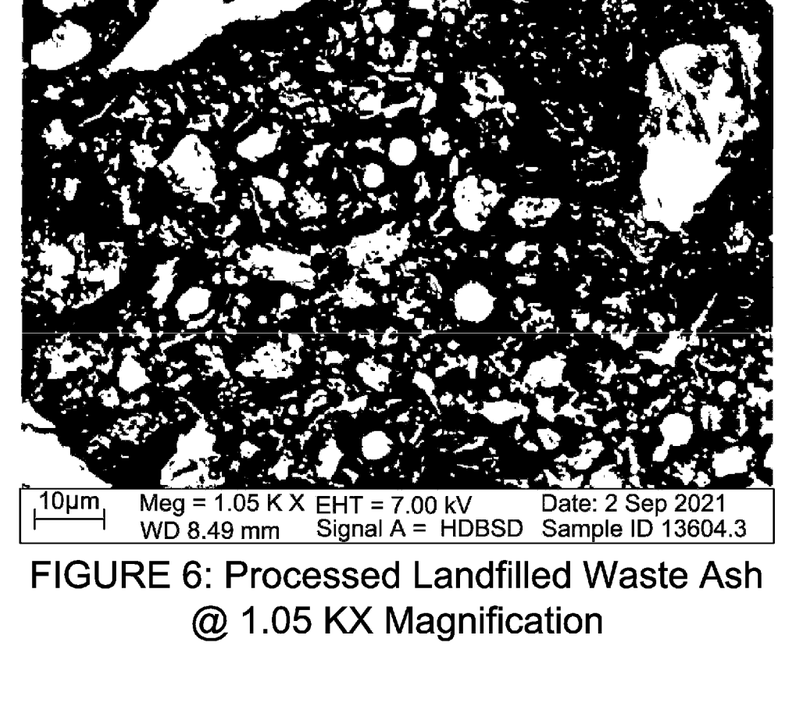
FIG. 6 is an electron microscope photo of waste landfilled coal fly ash after being processed pursuant to this disclosure.

FIGS. 5 and 6 are electron microscope photographs of waste landfilled coal fly ash prior to be processed pursuant to this disclosure.

As illustrated in FIG. 5 and FIG. 6, a significant beneficial change can be seen in both the shape, surface deposits and size of ash before processing with the PABS versus after processing.

Figure 7:
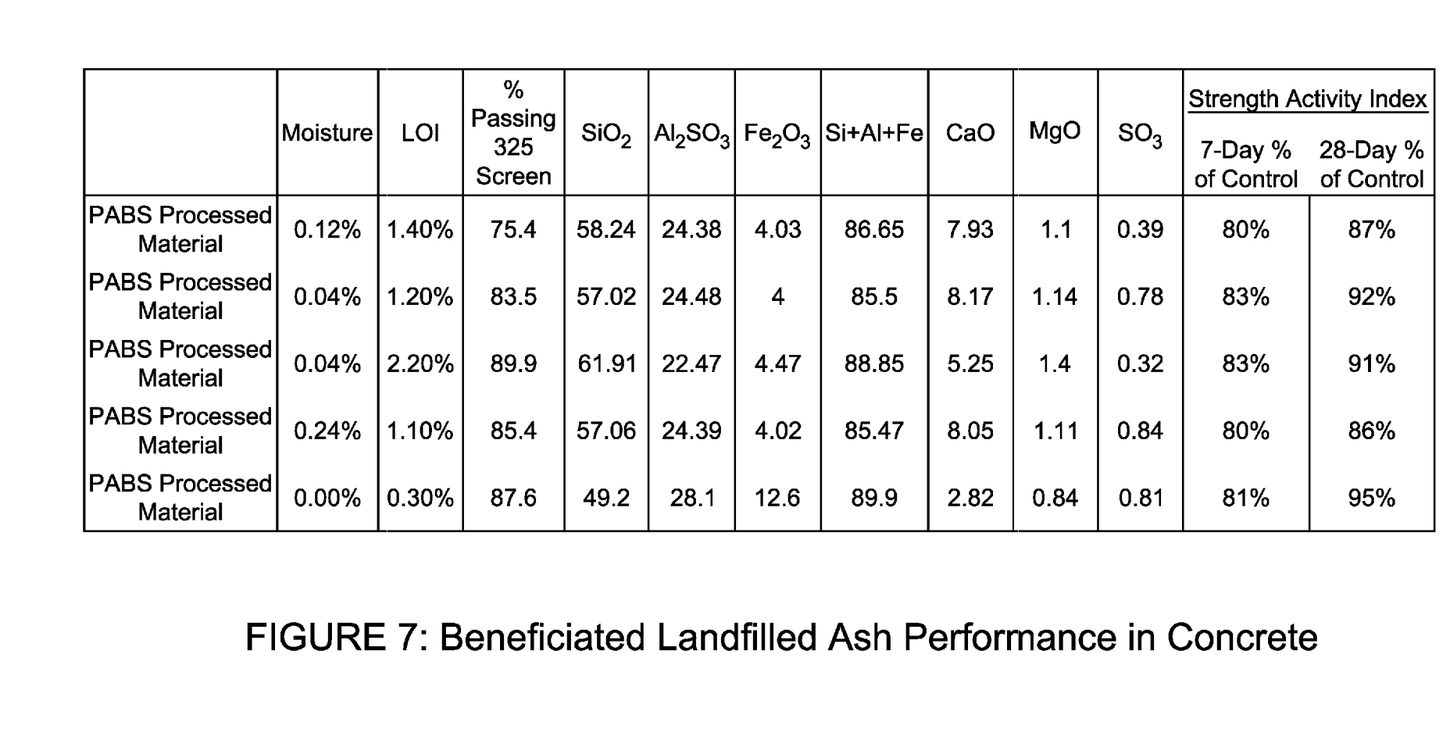
FIG. 7 is a summary table showing the beneficiated waste coal fly ash performance in concrete after suitably employing the system and related methods of this disclosure.

FIG. 7 is a summary table showing the beneficiated waste coal fly ash performance in concrete after suitably employing the system and related methods of this disclosure As illustrated in FIG. 7, landfilled or ponded waste coal fly performs well in concrete after being processed through the Ponded Ash Beneficiation System. The table demonstrates consistency across several waste ash sources.

The novelty and advantages of the above-described methods and systems are apparent from the foregoing description. Among them, the disclosed, ponded ash beneficiation system (PABS) compared to traditional carbon burnout or triboelectric separation has the following distinctions and advantages:

Improved efficiency due to:
  i. more specific temperature range
  ii. improved specific air to carbon balance
  iii. increased ash homogenization
  iv. specific retention time
  v. reduced particle size
  vi. integrated particle separation
  vii. recirculation of material
  viii. waste heat recovery potential
  ix. application of electrical energy or hydrogen fuel as a heat source (where applicable)

Improved Process Design
  i. Independent of a coal fired power plant
  ii. Modular design of primary components iii. Portable/relocatable after the waste ash source is depleted
iv. Wide range of feed input variation
v. 100% on electrical design available Improved Finished Product due to:
i. homogeneity of beneficiated ash
ii. integrated blending of admixtures
iii. integrated blending of process additions for ternary blends
iv. consistent particle size
v. angular particle shape
vi. increased particle surface area
vii. increased Cenosphere yield
viii. LOI<2%
ix. sulfur and chlorine reduction
x. improved workability
xi. increased strength
xii. oxidation removal
xiii. destruction of hydrocarbons
xiv. destruction of organics

What is claimed is:

1. A process for beneficiating landfilled or ponded waste coal fly ash the process comprising:
forming a waste coal fly ash stream having greater than 2% LOI of carbon from waste coal fly ash collected at ambient temperature from a pond or landfill;
subjecting the waste coal fly ash stream to elevated temperatures sufficiently above the ambient temperature to remove at least 75% of the carbon from the waste coal fly ash, the elevated temperature predetermined as a function of at least one of the following characteristics of the collected waste coal fly ash: moisture, LOI, and particle size;
exposing the waste coal fly ash stream to an oxygen-rich atmosphere by introduction of additional air, while subjecting the waste coal fly ash stream to the elevated temperature, the oxygen-rich atmosphere predetermined as a function of at least one of the following characteristics of the collected waste coal fly ash: LOI, hydrolysis, and available carbonates; and
performing the steps of subjecting the waste coal fly ash stream to the predetermined elevated temperature and to the predetermined oxygen-rich atmosphere for a processing time predetermined to reduce the LOI of the waste coal fly ash to 2% or less, thereby forming a beneficiated coal fly ash,
wherein the waste coal fly ash comprises oxidized ash characterized by having coarse waste coal fly ash particles having sizes ranging from 50-635 microns, and wherein the process comprises reducing the coarse waste coal fly ash particle size by 95% during the exposing of the waste coal fly ash stream to heat, and subsequently separating and continually recirculating the coarse waste coal ash particles after the exposure to the heat to form a beneficiated coal fly ash characterized by a minimum of 66% of the beneficiated coal fly ash particles passing through a 44 micron screen.

2. The process of claim 1, wherein the collecting step comprises creating a stockpile of landfilled or ponded waste coal fly ash with a moisture content ranging from 3% to 40%, and further comprising the steps of reducing the moisture by application of heat in advance of particle size reduction.

3. The process of claim 1, further comprising the step of inserting the waste coal fly ash stream into a moisture reduction vessel prior to the step of exposing the waste coal fly ash stream to the oxygen-rich environment to form a dried waste coal fly ash.

4. The process of claim 3, further comprising the step of inserting the dried waste coal fly ash into a vibratory screen after the step of inserting the waste coal fly ash stream into the moisture reduction vessel.

5. The process of claim 1, further comprising the steps of testing and homogenizing the waste coal fly ash stream after collection thereof.

6. A process for beneficiating landfilled or ponded waste coal fly ash the process comprising:
forming a waste coal fly ash stream having greater than 2% LOI of carbon from waste coal fly ash collected at ambient temperature from a pond or landfill;
subjecting the waste coal fly ash stream to elevated temperatures sufficiently above the ambient temperature to remove at least 75% of the carbon from the waste coal fly ash, the elevated temperature predetermined as a function of at least one of the following characteristics of the collected waste coal fly ash: moisture, LOI, and particle size;
exposing the waste coal fly ash stream to an oxygen-rich atmosphere by introduction of additional air, while subjecting the waste coal fly ash stream to the elevated temperature, the oxygen-rich atmosphere predetermined as a function of at least one of the following characteristics of the collected waste coal fly ash: LOI, hydrolysis, and available carbonates;
performing the steps of subjecting the waste coal fly ash stream to the predetermined elevated temperature and to the predetermined oxygen-rich atmosphere for a processing time predetermined to reduce the LOI of the waste coal fly ash to 2% or less, thereby forming a beneficiated coal fly ash; and
providing for internal cascade flow of the waste coal fly ash against a carbon reduction kiln shell to facilitate increased exposure to oxygen during the selected range of the processing time,
wherein the waste coal fly ash comprises oxidized ash characterized by having coarse waste coal fly ash particles having sizes ranging from 50-635 microns, and wherein the process comprises reducing the coarse waste coal fly ash particle size by 95% during the exposing of the waste coal fly ash stream to heat, and subsequently separating and continually recirculating the coarse waste coal ash particles after the exposure to the heat to form a beneficiated coal fly ash characterized by a minimum of 66% of the beneficiated coal fly ash particles passing through a 44 micron screen.

7. A process for beneficiating landfilled or ponded waste coal fly ash the process comprising:
forming a waste coal fly ash stream having greater than 2% LOI of carbon from waste coal fly ash collected at ambient temperature from a pond or landfill;
subjecting the waste coal fly ash stream to elevated temperatures sufficiently above the ambient temperature to remove at least 75% of the carbon from the waste coal fly ash, the elevated temperature predetermined as a function of at least one of the following characteristics of the collected waste coal fly ash: moisture, LOI, and particle size;
inserting the waste coal fly ash stream into a moisture reduction vessel;
inserting the dried waste coal fly ash into a vibratory screen;

inserting the dried and screened waste coal fly ash into a system adapted to reduce particle size and oxidation of the beneficiated coal fly ash;

exposing the waste coal fly ash stream to an oxygen-rich atmosphere by introduction of additional air, while subjecting the waste coal fly ash stream to the elevated temperature, the oxygen-rich atmosphere predetermined as a function of at least one of the following characteristics of the collected waste coal fly ash: LOI, hydrolysis, and available carbonates; and performing the steps of subjecting the waste coal fly ash stream to the predetermined elevated temperature and to the predetermined oxygen-rich atmosphere for a processing time predetermined to reduce the LOI of the waste coal fly ash to 2% or less, thereby forming a beneficiated coal fly ash, wherein the waste coal fly ash comprises oxidized ash characterized by having coarse waste coal fly ash particles having sizes ranging from 50-635 microns, and wherein the process comprises reducing the coarse waste coal fly ash particle size by 95% during the exposing of the waste coal fly ash stream to heat, and subsequently separating and continually recirculating the coarse waste coal ash particles after the exposure to the heat to form a beneficiated coal fly ash characterized by a minimum of 66% of the beneficiated coal fly ash particles passing through a 44 micron screen.

8. A process for beneficiating landfilled or ponded waste coal fly ash the process comprising:

forming a waste coal fly ash stream having greater than 2% LOI of carbon from waste coal fly ash collected at ambient temperature from a pond or landfill;

subjecting the waste coal fly ash stream to elevated temperatures sufficiently above the ambient temperature to remove at least 75% of the carbon from the waste coal fly ash, the elevated temperature predetermined as a function of at least one of the following characteristics of the collected waste coal fly ash: moisture, LOI, and particle size;

inserting the waste coal fly ash stream into a moisture reduction vessel to form a dried waste coal fly ash, wherein the moisture reduction vessel is selected from the group consisting of a dryer and an aero acoustic machine;

exposing the dried waste coal fly ash stream to an oxygen-rich atmosphere by introduction of additional air, while subjecting the waste coal fly ash stream to the elevated temperature, the oxygen-rich atmosphere predetermined as a function of at least one of the following characteristics of the collected waste coal fly ash: LOI, hydrolysis, and available carbonates; and performing the steps of subjecting the waste coal fly ash stream to the predetermined elevated temperature and to the predetermined oxygen-rich atmosphere for a processing time predetermined to reduce the LOI of the waste coal fly ash to 2% or less, thereby forming a beneficiated coal fly ash.

9. A process for beneficiating landfilled or ponded waste coal fly ash the process comprising:

forming a waste coal fly ash stream having greater than 2% LOI of carbon from waste coal fly ash collected at ambient temperature from a pond or landfill;

subjecting the waste coal fly ash stream to elevated temperatures sufficiently above the ambient temperature to remove at least 75% of the carbon from the waste coal fly ash, the elevated temperature predetermined as a function of at least one of the following characteristics of the collected waste coal fly ash: moisture, LOI, and particle size;

exposing the waste coal fly ash stream to an oxygen-rich atmosphere by introduction of additional air, while subjecting the waste coal fly ash stream to the elevated temperature, the oxygen-rich atmosphere predetermined as a function of at least one of the following characteristics of the collected waste coal fly ash: LOI, hydrolysis, and available carbonates; and performing the steps of subjecting the waste coal fly ash stream to the predetermined elevated temperature and to the predetermined oxygen-rich atmosphere for a processing time predetermined to reduce the LOI of the waste coal fly ash to 2% or less, thereby forming a beneficiated coal fly ash, wherein the waste coal fly ash comprises oxidized ash characterized by having coarse waste coal fly ash particles having sizes ranging from 50-635 microns, and wherein the process comprises reducing the coarse waste coal fly ash particle size by 95% during the exposing of the waste coal fly ash stream to heat, and subsequently separating and continually recirculating the coarse waste coal ash particles after the exposure to the heat to form a beneficiated coal fly ash characterized by a minimum of 66% of the beneficiated coal fly ash particles passing through a 44 micron screen, wherein the elevated temperature is between 900° F. and 1150° F.

* * * * *